United States Patent [19]
Liu et al.

[11] Patent Number: 6,136,234
[45] Date of Patent: Oct. 24, 2000

[54] PROCESS FOR FABRICATING A GRADIENT REFRACTIVE-INDEX PLASTIC ROD USING CENTRIFUGAL DIFFUSING POLYMERIZATION METHOD

[75] Inventors: Jui-Hsiang Liu; Jiunn-Lang Chen, both of Tainan, Taiwan

[73] Assignee: National Science Council, Taipei, Taiwan

[21] Appl. No.: 09/334,306

[22] Filed: Jun. 16, 1999

[30] Foreign Application Priority Data

Nov. 30, 1998 [TW] Taiwan ................. 87119941

[51] Int. Cl.[7] .................................................. B29D 4/00
[52] U.S. Cl. .................. 264/1.27; 264/1.36; 264/1.38; 264/2.1; 264/1.24
[58] Field of Search .................... 264/1.1, 1.24, 264/1.27, 1.36, 1.38, 2.1, 343

[56] References Cited

U.S. PATENT DOCUMENTS 3,718,383  2/1973  Moore .
5,405,556  4/1995  Liu ........................................ 264/1.24
5,541,247  7/1996  Koike .................................... 264/1.24
5,593,621  1/1997  Koike et al. ......................... 264/1.29
5,846,456  12/1998 Liu ......................................... 264/1.6

*Primary Examiner*—Mathieu D. Vargot
*Attorney, Agent, or Firm*—Fish & Richardson P.C.

[57] ABSTRACT

A gradient refractive-index plastic rod is prepared by pre-polymerizing a mixture containing a first monomer and at least a component selected from a second monomer and a non-reactive dopant sealed in a tube, while rotating the tube horizontally around its longitudinal axis; and polymerizing the resulting prepolymer or prepolymers while keeping the tube vertical. In the vertical polymerization stage, the polymerization undergoes in the direction from the periphery to the center of the tube due to an increase of polymerization rate caused by gel effect of the prepolymers which has been piled up on the tube wall during the centrifugal stage, so that the monomers contained in the central part of the tube diffuse outwardly, and thus a plastic rod having a larger region of gradient refractive-index is obtained.

31 Claims, 4 Drawing Sheets

PROCESS FOR FABRICATING A GRADIENT REFRACTIVE-INDEX PLASTIC ROD USING CENTRIFUGAL DIFFUSING POLYMERIZATION METHOD

FIELD OF THE INVENTION

The present invention is related to a process of fabrication of a gradient refractive-index (GRIN) plastic rod for use as a medium of image-transmission and for preparing a plastic optical fiber by melt spinning.

BACKGROUND OF THE INVENTION

The gradient refractive-index (GRIN) rod lens is a cylindrical medium with a parabolic refractive distribution in which the refractive index is highest on the rod's optical axis and decreases toward the periphery with the square of the radial distance from the optical axis. GRIN elements with imaging and light-focusing properties have been used widely in image-transmission systems [Y. Koike, "Gradient index materials and compounds", L. A. Hormak, Ed., Marcel Dekker, Inc., New York 1992; Y. Koike, T. Ishigure, A. Horibe, E. Nihei, Proceedings of second International Conference on Plastic Optical Fibers and Applications, Geneva, p. 54, 1993; H. Tsuchida, T. Nagaoka, K. Yamamoto, Jap. J. Appl. Phys. Part 1, 37, 3633 (1998)] and optical communication systems [J. Wilson, J. F. B. Hawkes, "Optoelectronics: An introduction", Prentice Hall, New Jersey, p. 357–377, 1983; G. Stewart, A. Mencaglia, W. Philip, W. Jin, J. Lightwave Tech. 16, 43 (1998); S. H. Song, S. Park, C. H. Oh, P. S. Kim, M. H. Cho, Y. S. Kim, Opt. Lett. 23, 1025 (1998); T. Fukushima, T. Yokota, T. Sakamoto, J. Lightwave Tech. 15, 1938 (1997); A. Safaaijazi, V. Suppanitchakij, IEEE J. Ouantum Electro. 33, 2159 (1997)] such as copy machines, facsimile lens arrays, and optical circuit networks. Glasses and polymers are the two well-known materials applied in the optical field. The former have excellent transparency and low optical attenuation, but brittleness and high process cost are their disadvantages. The latter have higher optical loss but excellent mechanical properties, light weight, good flexibility, easy processing, and low cost. As a result the development of GRIN polymers has grown rapidly in recent years [S. P. Wu, E. Nihei, Y. Koike, Polym. J. 27, 21 (1995); C. Wang, D. L. Shealy, Appl. Opt. 32, 4763 (1993)].

Gradient refractive index (GRIN) optical rods with a quadratic refractive index distribution varying continuously from the optical axis to the periphery have been widely studied because of their potential application in self-focusing imaging and optical communications recently. Several methods have been used to prepare GRIN polymeric optical rods: two-step copolymerization [Y. Ohtsuka, Y. Terao, J. Appl. Polym. Sci. 26, 2907 (1981); Y. Ohtsuka, T. Sugaho, Appl. Opt. 22, 413 (1983)], the extrusion method [B. C. Ho, J. H. Chen, W. C. Chen, Y. H. Chang, Polym. J. 27, 310 (1995)], interfacial-gel copolymerization [Y. Koike, Y. Kimoto, Y. Ohtsuka, Appl. Opt. 21, 1057 (1982)], and photopolymerization [J. H. Liu, M. H. Chu, Angew. Macromol. Chem. 174,1 (1989)].

In a series of the studies of one of the present inventors and his co-workers, on the GRIN rods, a method of swollen-gel polymerization for preparing the large core and bubble-free GRIN polymer optical rods was reported [J. H. Liu, H. T. Liu, Opt. Lett. 22, 668 (1997); J. H. Liu, H. T. Liu, Macromol. Chem. Phys. 198, 3285 (1997); J. H. Liu, U.S. Pat. No. 5,846,456, December 1998; J. H. Liu, H. T. Liu, Y. B. Chen, Polymer, 39, 5549 (1998)]. In the swollen-gel polymerrization method, a comonomer mixture is injected into a preformed polymer tube, and the polymerization of the comonomer mixture will be initiated after the preformed polymer tube is swelled by the comonomer mixture for a period of time. The preformed polymer tube has to be uniform in thickness and free from substantial deformation during swelling in order to ensure that the GRIN polymer optical rod so fabricated has desired optical characteristics. It is difficult to make such a preformed polymer tube that it not only can be swelled by the comonomer mixture, but is uniform in thickness and free from substantial deformation during swelling. Consequently, the reproducibility of the GRIN polymer optical rod fabricated by the swollen-gel polymerization method is not satisfactory, and thus there is a need to provide an improved method for fabricating the GRIN plastic rod, which is easy in operation and has a high reproducibility.

SUMMARY OF THE INVENTION

An object of the invention of the present application is to provide a process for fabricating a gradient refractive-index (GRIN) plastic rod having a good symmetric refractive index distribution.

Another object of the invention of the present application is to provide a process for fabricating a gradient refractive-index (GRIN) plastic rod, which has a high product reproducibility.

A further object of the invention of the present application is to provide a process for fabricating a gradient refractive-index (GRIN) plastic rod, which is easy to be carried out.

In order to accomplish the aforesaid objects, a process for fabricating a gradient refractive-index (GRIN) plastic rod accomplished according to the present invention comprises the steps as follows:

a) sealing a monomer composition in a tube, wherein said monomer composition comprises a first monomer and at least a component selected from the group consisting of a second monomer and a non-reactive dopant;

b) prepolymerizing the first monomer, and the second monomer, if present, while rotating the tube horizontally around its longitudinal axis; and c) polymerizing the resulting prepolymer or prepolymers while keeping the tube vertical, so that i) a plastic rod comprising the resulting polymer of the first monomer and the non-reactive dopant; ii) a plastic rod comprising the resulting polymers of the first monomer and the second monomer; or iii) a plastic rod comprising the resulting polymers of the first monomer and the second monomer, and the non-reactive dopant is formed in the tube, wherein the non-reactive dopant has a refractive index greater than that of the resulting polymer of the first monomer in case i); the first monomer has a polymerization reactivity higher than that of the second monomer, and the resulting polymer of the first monomer has a refractive index less than that of the resulting polymer of the second monomer in case ii); and the non-reactive dopant has a refractive index greater those of the resulting polymers of the first monomer and the second monomer in case iii).

GRIN plastic rods with good symmetric refractive index distribution can be fabricated by using the novel centrifugal diffusing polymerization technique developed in the present invention. In step b) centrifugal stage, a centrifugal temperature ($T_1$) and a centrifugal period ($t_1$) are two factors affecting the degree of polymerization. If the centrifugal temperature $T_1$ is low, the centrifugal period $t_1$ will have to be extended so that a sufficient amount of prepolymer can be formed. The polymerization rate of the monomers in the monomer composition will be increased, when $T_1$ is high. Consequently, the centrifugal period $t_1$ is shorter. The optical characteristics of GRIN rods manufactured in the present invention can be adjusted by varying the ratio of the first monomer to the second component in the monomer composition, and they also can be changed by varying the adding amount of the additional prepolymer or oligomer and/or the centrifugal period. In step c) vertical polymerization stage, the polymerization undergoes in the direction from the periphery to the center of the tube due to an increase of polymerization rate caused by gel effect, so that the monomers contained in the central part of the tube diffuse outwardly, and thus not only a shrinking problem accompanied with the polymerization reaction is avoided, but a larger region of gradient refractive-index is obtained.

Moreover, the surface of the plastic rod prepared in the present invention is smooth, when the tube is a glass tube; and the diameter thereof can easily be changed, when a tube with a different diameter is used.

BRIEF DESCRIPTION OF THE DRAWINGS

In FIG. 7(a) the distance between the letter "A" and the end face of GRIN rod is 50 mm, and the distance between the image and the other end face of GRIN rod is 255 mm; and in FIG. 7(b) the distance between the letters "GRIN" and the end face of the GRIN rod is 72 mm, and the distance between the image and the other end face of GRIN rod is 185 mm.

DETAILED DESCRIPTION OF THE INVENTION

Figure 1:
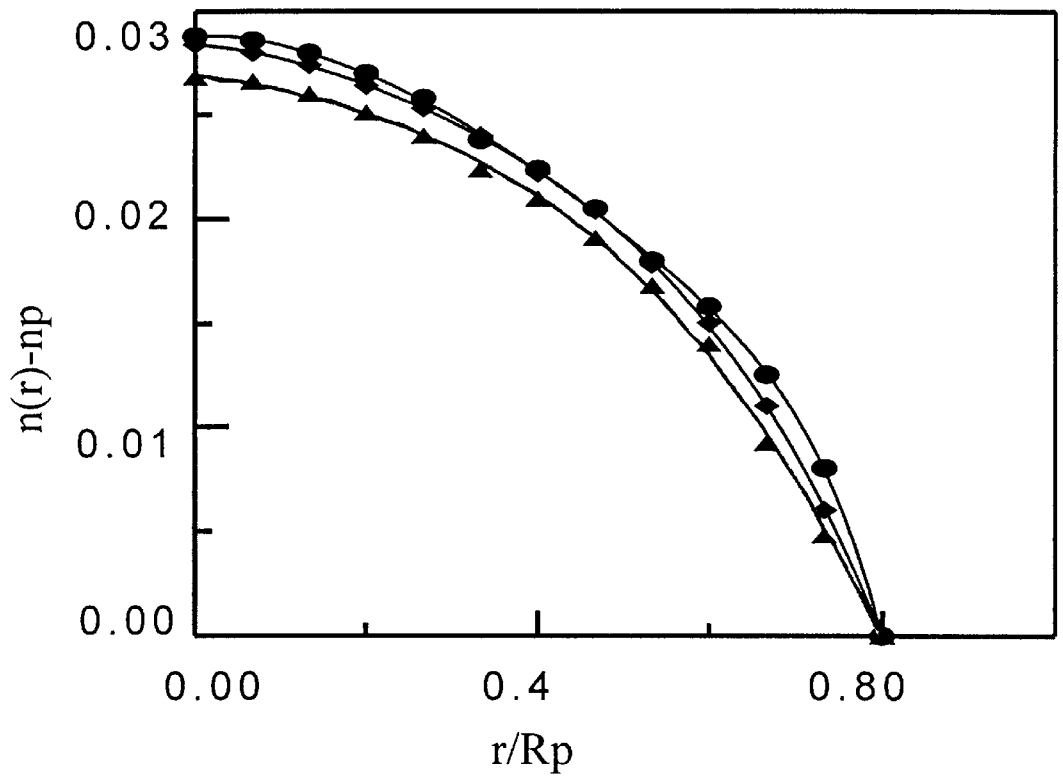
FIG. 1 is a (n(r)-np) vs. r/Rp plot which shows dependence of initiator (AIBN) concentration on refractive-index distribution of GRIN rods prepared according to the present invention under $T_1=55°$ C., $t_1=2$ h, MMA/DS=3/1, wherein. Rp is the radius of the rod, r is the distance measured from the center of the rod, n(r) is the refractive index at the distance r, and np is the refractive index at Rp, wherein (●):AIBN=0.1 wt %; (♦):AIBN=0.15 wt %; (▲): AIBN= 0.2 wt %,.

In embodying the process of the present invention as described in the Summary of the Invention, preferably an additional prepolymer or oligomer of the first monomer is added to the monomer composition prior to sealing. Moreover, an initiator for polymerizing the first monomer may be added to the monomer composition prior to sealing. Suitable initiator includes (but not limited to) photo-type and thermal-type initiators. Preferably, the first monomer and the second monomer are both acrylate, such as methyl methacrylate, benzyl methacrylate, and tetra-fluoropyl methacrylate. In one of the preferred embodiments of the present invention, the first monomer is methyl methacrylate and the second monomer is benzyl methacrylate, and the thermal-type initiator is used. The thermal-type initiators for acrylates are well known in the art, and azobisisobutyronitrile (AIBN) and benzoyl peroxide (BPO) are typical examples.

Preferably, the non-reactive dopant used in the process of the present invention is selected from the group consisting essentially of diphenyl sulfide, benzyl salicylate, 1,4-dibromobenzene, 1-bromonaphthalene and triphenyl phosphate. More preferably, the non-reactive dopant is diphenyl sulfide, when the first monomer is methyl methacrylate, benzyl methacrylate, or tetra-fluoropyl methacrylate.

Preferably, the tube used in the process of the present invention is a glass tube.

Preferably, the prepolymerization in step b) of the process of the present invention is carried out by heating the tube at a temperature of 35–100° C. for a period of 1–15 hours in the presence of a thermal-type initiator while rotating the tube at a speed of 80–1000 rpm.

Alternatively, the prepolymerization in step b) of the process of the present invention is carried out by or irradiating the tube for a period of 1–15 hours in the presence of a photo-type initiator while rotating the tube at a speed of 80–1000 rpm.

Preferably, the polymerization in step c) of the process of the present invention is carried out by heating the tube at a temperature of 35–100° C. for a period of 1–15 hours or by irradiating the tube for a period of 1–15 hours.

Preferably, the monomer composition in step a) of the process of the present invention is composed of 15–30% of the non-reactive dopant and 85–70% of the first monomer, based on the weight of the monomer composition.

Preferably, the monomer composition in step a) of the process of the present invention is composed of 15–30 wt % of the non-reactive dopant, 83–50 wt % of the first monomer and 2–20 wt % of the additional prepolymer or oligomer, based on the weight of the monomer composition.

Preferably, the monomer composition in step a) of the process of the present invention is composed of 15–30 wt % of the non-reactive dopant; 85–70 wt % of the first monomer, based on the total weight of the non-reactive dopant and the first monomer; and 0.1–0.5 wt % of the initiator, based on the weight of the first monomer.

Preferably, the monomer composition in step a) of the process of the present invention is composed of 15–30 wt % of the non-reactive dopant; 83–50 wt % of the first monomer; 2–20 wt % of the additional prepolymer or oligomer, based on the total weight of the non-reactive dopant, the first monomer, and the additional prepolymer or oligomer; and 0.1–0.5 wt % of the initiator, based on the weight of the first monomer.

Preferably, the monomer composition in step a) of the process of the present invention is composed of 15–30% of the second monomer and 85–70% of the first monomer, based on the weight of the monomer composition.

Preferably, the monomer composition in step a) of the process of the present invention is composed of 15–30 wt % of the second monomer, 83–50 wt % of the first monomer and 2–20 wt % of the additional prepolymer or oligomer, based on the weight of the monomer composition.

Preferably, the monomer composition in step a) of the process of the present invention is composed of 15–30 wt % of the second monomer; 85–70 wt % of the first monomer, based on the total weight of the first and second monomers; and 0.1–0.5 wt % of initiators for polymerizing the first monomer and the second monomer, based on the total weight of the first and second monomers.

Preferably, the monomer composition in step a) of the process of the present invention is composed of 15–30 wt % of the second monomer; 83–50 wt % of the first monomer; 2–20 wt % of the additional prepolymer or oligomer, based on the total weight of the first monomer, the second monomer and the additional prepolymer or oligomer; and 0.1–0.5 wt % of initiators for polymerizing the first monomer and the second monomer, based on the total weight of the first and second monomers.

In one of the preferred embodiments of the present invention, the plastic rod has a gradient refractive index decreasing in a direction from its central axis to its periphery from within a region from its central axis to 80% of its radius.

The refractive indexes of the monomers and the non-reactive dopants suitable for use in the present invention are listed in Table 1.

TABLE 1

| Monomer | Refractive index of polymer |
| --- | --- |
| Methyl methacrylate (MMA) | 1.49 |
| Benzyl methacrylate (BzMA) | 1.568 |
| Tetra-fluoropyl methacrylate | 1.42 |
| Non-reactive dopant | Refractive index |
| Diphenyl sulfide (DS) | 1.63 |
| Benzyl salicylate (BSA) | 1.58 |
| 1,4-Dibromobenzene | 1.574 |
| 1-Bromonaphthalene (BN) | 1.66 |
| Triphenyl phosphate (TP) | 1.55 |

In the following examples, plastic GRIN optical rods were prepared by using a novel centrifugal diffusing polymerization technique according to the present invention. Methyl methacrylate (MMA)] was used as the first monomer, benzyl methacrylate (BzMA) was used as the second monomer, and diphenyl sulfide (DS) was used as the non-reactive dopant. Effects of feed weight ratio of MMA/DS or MMA/BzMA, initiator concentration, heating temperature, prepolymerization time and the adding amount of PMMA prepolymer on the optical characteristics of the plastic rods were investigated.

EXPERIMENTS

Analysis apparatus

The refractive index profile of the prepared GRIN rods were measured with a York-P102 profile analyzer. The refractive index of the matching oil used in the system is 1.458. The image through the GRIN polymer rods were recorded by a camera equipped with an enlarge lens. The purity of the compounds used in this investigation are all confirmed by FT-IR, NMR, EA and HPLC. Inhibitor contained in monomer was removed by washing with alkali solution and then distilled in vacuum.

Materials

Methyl methacrylate (MMA) (99%, from TCI) was used as the first monomer having a lower refractive index, the refractive index of MMA and poly(methyl methacrylate) (PMMA) are 1.41 and 1.49, respectively. The refractive index of diphenyl sulfide (DS) (GR grade, from Tokyo Kasei Co., Japan) is 1.63, which was used as the non-reactive dopant with higher refractive index. The refractive index of poly(benzyl methacrylate) (PBzMA) is 1.568, which was prepared from benzyl methacrylate (BzMA) monomer (GR grade, from Tokyo Kasei Co., Japan). PMMA prepolymer having a weight averaged molecular weight of 120,000 was obtained from Chi Mei Co., Taiwan. Hydroquinone contained in monomers were removed by washed with alkali solution. Azobisisobutyronitrile (AIBN) was used as the initiator, which was recrystallized from ethanol. Reagent ratios used in this investigation are all weight percentages.

Preparation of GRIN plastic optical rods

In the centrifugal diffusing polymerization, a mixture of methyl methacrylate (MMA), diphenyl sulfide (DS) or benzyl methacrylate (BzMA), and AIBN initiator with or without a specified amount of prepolymer of poly(methyl methacrylate), was poured into a glass tube. The tube containing the monomer mixture was capped and then rotated horizontally long its longitudinal tube at $T_1$ ° C. for $t_1$ h. The rotating speed was controlled at 300 rpm. During the centrifugal stage, heavier compounds such as the prepolymer formed in the mixture and the prepolymer added to the mixture were piled up on the glass wall due to the rotating of the tube. After completion of the centrifugal process, the tube was heated vertically at 80° C. for 6 h. The vertical polymerization temperature and time have no significant effect on the optical characteristics of the plastic rods as long as the monomers and prepolymers contained in the tube are completely polymerized. In this stage, polymerization taking place in the gel phase near the glass wall is faster than in the monomer solution in the central area, thereby a polymer is gradually formed in the direction from the periphery to the center of the rod and the non-reactive dopant diphenyl sulfide (DS) was pushed in the same direction. Finally, a refractive index (GRIN) plastic rod was fabricated. The distribution of DS dopant in polymer matrix leads to the formation of refractive index profile. In the case where the second monomer (for example, BzMA) is used instead of the non-reactive dopant, a prepolymer of the first monomer (MMA) which has a polymerization reactivity higher than that of the second monomer is grown faster than that of the second monomer during the centrifugal stage, and thus more prepolymer of the first monomer (MMA) was piled up at a position having the same radius. During the vertical polymerization stage, the first and second monomers diffuse at different speeds from the central area to the periphery, because polymerization taking place in the gel phase near the glass wall is faster than in the monomer solution in the central area and also because the polymerization reactivities thereof are different. Therefore, the amount of the resulting polymer of the first monomer having a refractive index less than that of the resulting polymer of the second monomer gradually decreases relatively to the resulting polymer of the second monomer in the direction from the periphery to the center of the rod, and thus a refractive index (GRIN) plastic rod was fabricated.

Examples 1–3

Effects of initiator concentration (wt %) on the optical characteristics of GRIN rods $T_1=55°$ C., $t_1=2$ h, MMA/DS= 3/1

Gradient refractive index (GRIN) plastic rods were fabricated by using the novel centrifugal diffusing polymerization technique developed in this invention. The results suggest that the central area of the rod has higher DS dopant concentration. Optical characteristics of GRIN rods prepared by the centrifugal diffusing polymerization with various initiator concentrations at T=55° C. for 2 h and MMA/DS=3/1 are listed in Table 1. In Table 1, $\Delta n$ is the refractive index difference between the center and the periphery of the rod, NA is the numeric aperture, and $\theta_{max}$ is the maximum acceptance angle, all can be calculated from the equations in the above-mentioned prior art [S. P. Wu, E. Nihei, Y. Koike, Polym. J. 27, 21 (1995); C. Wang, D. L. Shealy, Appl. Opt. 32, 4763 (1993); Y. Ohtsuka, Y. Terao, J. Appl. Polym. Sci. 26, 2907 (1981)].

TABLE 1

Effects of initiator concentration (wt %) on the optical characteristics of GRIN rods[a].

| AIBN[b](wt %) | Ex. 1<br>0.1% | Ex. 2<br>0.15% | Ex. 3<br>0.2% |
|---|---|---|---|
| $\Delta n$ | 0.288 | 0.0284 | 0.0268 |
| A | 0.0477 | 0.0475 | 0.0460 |
| NA | 0.2943 | 0.2923 | 0.2839 |
| $2\theta_{max}$ | 34.23 | 33.99 | 32.99 |

[a]$T_1 = 55°$ C., $t_1 = 2$ h, MMA/DS = 3/1.
[b]Initiator concentration of azobisisobutyronitrile (AIBN), based on the weight of MMA.

Data in Table 1 show that $\Delta n$, NA, and $\theta_{max}$ all decrease when the amount of the concentration of initiator increases. These results suggest that increasing the initiator concentration will decrease the concentration difference of DS between the center and the periphery of the rod. In theory, a rod with high NA value has a high acceptance angle ($\theta_{max}$).

FIG. 1 shows the dependence of initiator concentration on the refractive-index distribution of the GRIN rods. The results suggest that the concentration of higher refractive index material of DS is decreased from the center axis to the periphery of the gel rod, and resulted in a GRIN distribution.

Examples 4–12

Effects of prepolymer addition on the optical characteristics of GRIN rods, MMA/DS=3/1, AIBN=0.1 wt %

Effects of adding amount of prepoymer (PMMA) under various preparing conditions of centrifugal temperature and centrifugal period on the optical characteristics of the rods were investigated. PMMA was added to a mixture of methyl methacrylate (MMA), diphenyl sulfide (DS) and AIBN initiator, and the resulting mixture was subjected to a centrifugal prepolymerization at $T_1$ ° C. for $t_1$ hours after the prepolymer added was fully swelled.

Table 2 shows the results of the effects of adding amount of PMMA on the optical characteristics of GRIN rods, when $T_1=50°$ C., $t_1=3$ h. Optical values of $\Delta n$ and NA decrease with increasing adding amount of PMMA. High $\Delta n$ value leads to greater values of NA and $\theta_{max}$. It is well known that high NA value or high acceptable angle ($\theta_{max}$) will bring about a high brightness, and the high brightness is a necessary factor for the GRIN lens to achieve high-speed scanning or make the machine compact when using GRIN rods in image-transmission systems.

TABLE 2

Effects of adding amount of PMMA (wt %) on the optical characteristics of GRIN rods[a].

| PMMA[b](wt %) | Ex. 4<br>0% | Ex. 5<br>5% | Ex. 6<br>15% |
|---|---|---|---|
| $\Delta n$ | 0.0268 | 0.0237 | 0.023 |
| A | 0.0447 | 0.0317 | 0.0456 |
| NA | 0.2839 | 0.2668 | 0.2628 |
| $2\theta_{max}$ | 32.99 | 30.95 | 30.47 |

[a]$T_1 = 50°$ C., $t_1 = 3$ h, MMA/DS = 3/1, AIBN = 0.1 wt %, based on the weight of MMA.
[b]PMMA adding amount, wt % which is based on the total weight of MMA, DS and PMMA.

Figure 2:
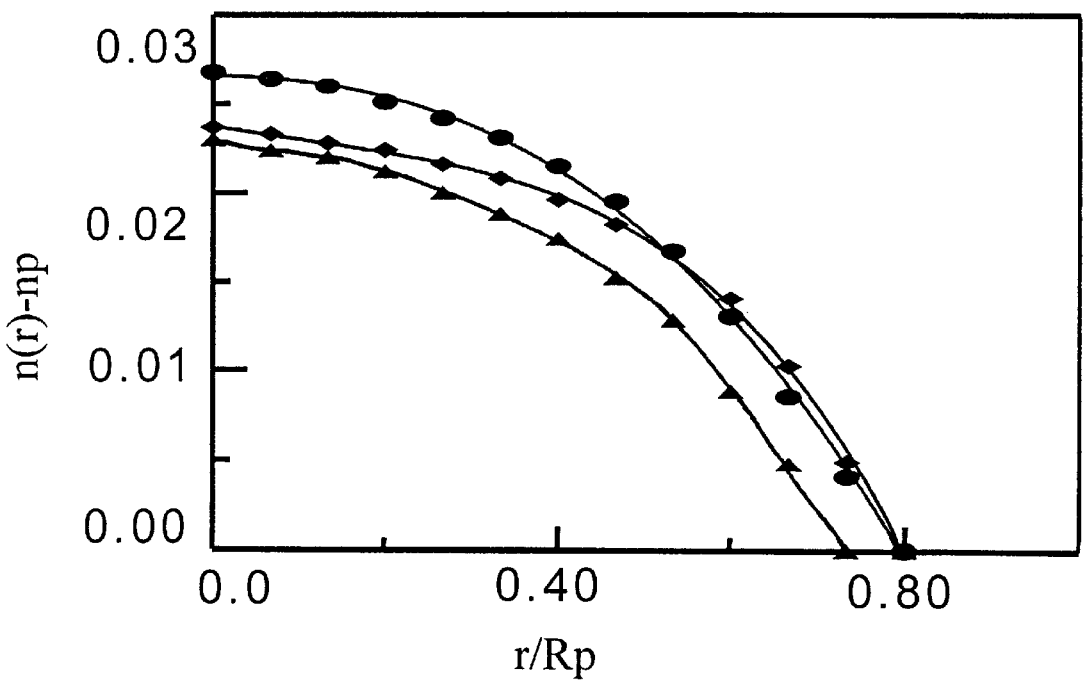
FIG. 2 is a (n(r)-np) vs. r/Rp plot which shows effects of adding amount of PMMA on refractive-index distribution of GRIN rods prepared according to the present invention, wherein (●):0 wt %; (♦):5 wt %; (▲):15 wt %, $T_1=50°$ C., $t_1=3$ h, MMA/DS=3/1, AIBN=0.1 wt %.

FIG. 2 shows the refractive-index distribution of the fabricated GRIN rods at T=50° C., t=3 h, MMA/DS=3/1, and AIBN=0.1 wt %. The n(r)-np value decreases with increasing adding amount of PMMA.

Tables 3 and 4 show the results of the effects of adding amount of PMMA on the optical characteristics of GRIN rods, when $T_1=55°$ C., $t_1=2$ h; and $T_1=60°$ C., $t_1=1$ h, respectively. It can be seen from the data shown in Tables 3 and 4 that the same trends of the effects of adding amount of PMMA (wt %) on the optical characteristics of GRIN as in Table 2 are observed.

TABLE 3

Effects of adding amount of PMMA (wt %) on the optical characteristics of GRIN rods[a].

| PMMA[b](wt %) | Ex. 7<br>0% | Ex. 8<br>5% | Ex. 9<br>15% |
|---|---|---|---|
| $\Delta n$ | 0.0288 | 0.0284 | 0.0268 |
| A | 0.0477 | 0.0475 | 0.0460 |
| NA | 0.2943 | 0.2923 | 0.2839 |
| $2\theta_{max}$ | 34.23 | 33.99 | 32.99 |

[a]$T_1 = 55°$ C., $t_1 = 2$ h, MMA/DS = 3/1, AIBN = 0.1 wt %, based on the weight of MMA.
[b]PMMA adding amount, wt % which is based on the total weight of MMA, DS and PMMA.

TABLE 4

Effects of adding amount of PMMA (wt %) on the optical characteristics of GRIN rods[a].

| PMMA[b](wt %) | Ex. 10<br>0% | Ex. 11<br>5% | Ex. 12<br>15% |
|---|---|---|---|
| $\Delta n$ | 0.0286 | 0.0241 | 0.0236 |
| A | 0.0363 | 0.0357 | 0.0433 |
| NA | 0.2933 | 0.2691 | 0.2662 |
| $2\theta_{max}$ | 34.11 | 31.22 | 30.88 |

[a]$T_1 = 60°$ C., $t_1 = 1$ h, MMA/DS = 3/1, AIBN = 0.1 wt %, based on the weight of MMA.
[b]PMMA adding amount, wt % which is based on the total weight of MMA, DS and PMMA.

Figure 3:
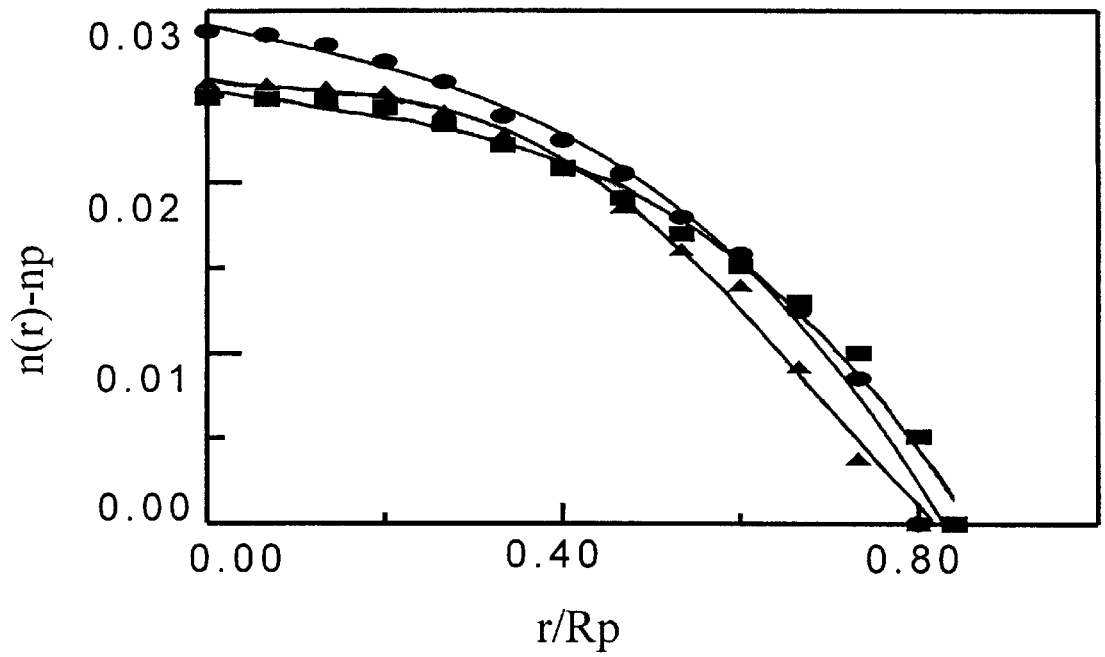
FIG. 3 is a plot which shows effects of adding amount of PMMA on refractive-index distribution of GRIN rods prepared according to the present invention, wherein (●):0 wt %; (♦):5 wt %; (■):15 wt %, $T_1=55°$ C., $t_1=2$ h, MMA/ DS=3/1, AIBN=0.1 wt %.
Figure 4:
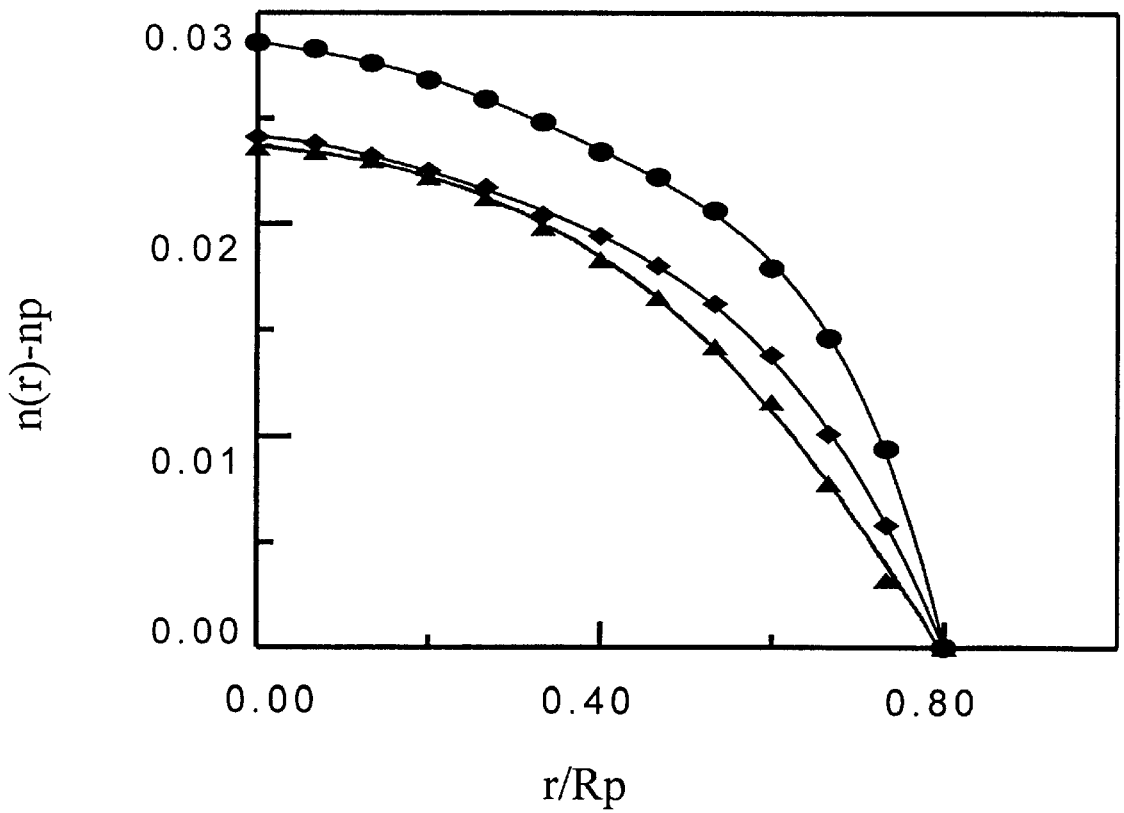
FIG. 4 is a plot which shows effects of adding amount of PMMA on refractive-index distribution of GRIN rods prepared according to the present invention, wherein (●):0 wt %; (♦):5 wt %; (▲):15 wt %, $T_1=60°$ C., $t_1=1$ h, MMA/ DS=3/1, AIBN=0.1 wt %.

FIGS. 3 and 4 show the refractive-index distribution of the fabricated GRIN rods at $T_1=55°$ C., $t_1=2$ h; and $T_1=60°$ C., $t_1=1$ h, respectively. The n(r)-np value decreases with increasing adding amount of PMMA.

Examples 13–15

Effects of MMA/DS weight ratio on the optical characteristics of GRIN rods, $T_1=55°$ C., $t_1=2$ h, PMMA=20 wt %, AIBN=0.1 wt %.

Table 5 shows the results of the investigation of MMA/DS weight ratio on the optical characteristics of prepared GRIN rods. As shown in Table 5, Δn value decreases with decreasing adding amount of MMA in the monomer mixture. It shows that a sufficient amount of DS dopant in the feed mixture is needed to arise the DS concentration in central area of rod, which in turn increases the Δn value.

Figure 5:
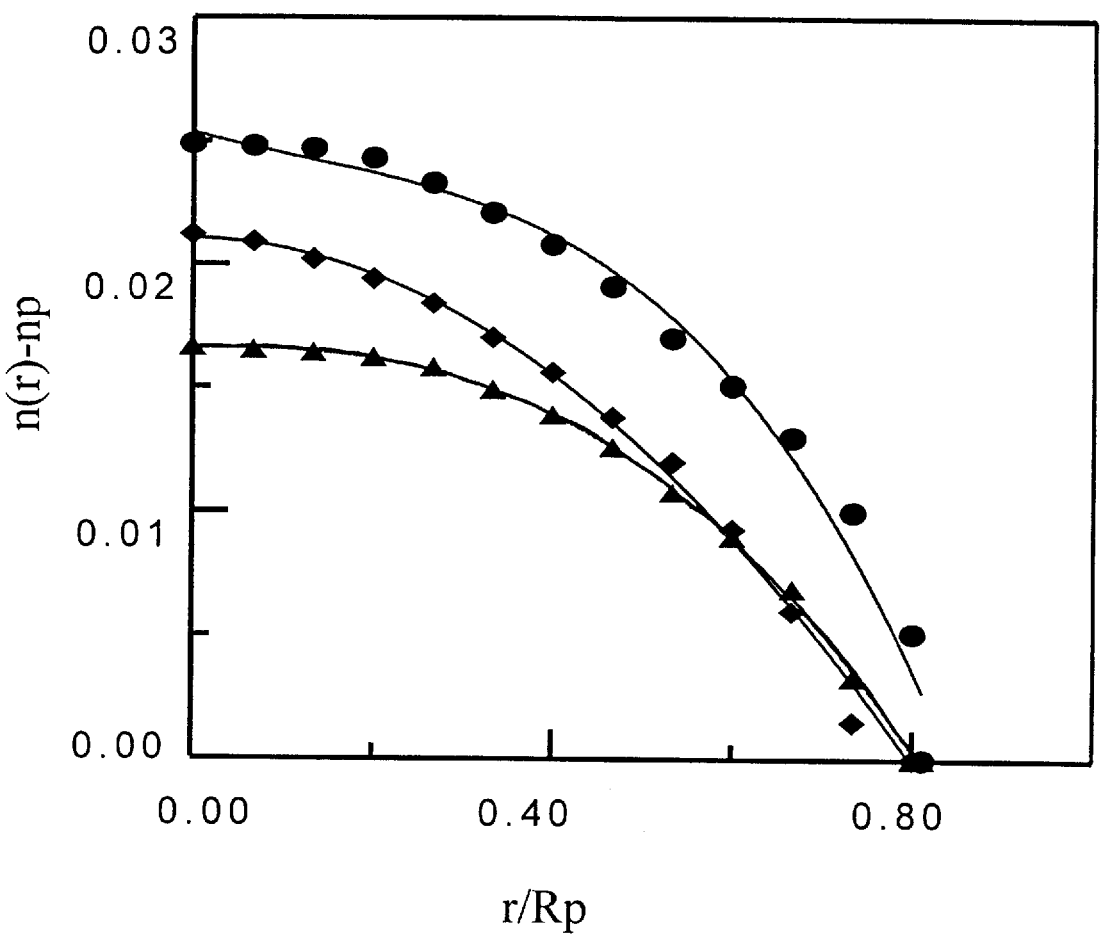
FIG. 5 is a plot which shows effects of MMA/DS weight ratio on refractive-index distribution of GRIN rods prepared according to the present invention, wherein (●):MMA/DS 3/1; (♦):MMA/DS=4/1; (▲): MMA/DS=5/1, $T_1=55°$ C., $t_1=2$ h, AIBN=0.1 wt %.

FIG. 5 shows the refractive-index distribution of the fabricated GRIN rods at $T_1=55°$ C., $t_1=2$ h, PMMA=20 wt %, and AIBN=0.1 wt %. The n(r)-np value decreases with increasing adding amount of MMA.

Examples 16–17

Effects of centrifugal time on the optical characteristics of GRIN rods, $T_1=50°$ C., MMA/DS=3/1, PMMA=20 wt % (based on the total weight of MMA, DS and PMMA), and AIBN=0.1 wt % (based on the weight of MMA).

The preparing conditions of two plastic rods were the same as those described in the title of the examples except that the centrifugal time $t_1$ was varied. When the centrifugal time $t_1$ was one hour, the plastic rod so formed did not have a gradient refractive-index (GRIN) characteristic. A GRIN plastic rod was obtained with Δn=0.0257, NA=0.2780 and $θ_{max}=32.27$, when the centrifugal time $t_1=2$ h. The results indicate that a plastic rod having GRIN characteristic can not be formed if the centrifugal time is too short to have a sufficient amount of prepolymer piled up on the glass wall.

Examples 18–19

Effects of centrifugal time on the optical characteristics of GRIN rods, $T_1=50°$ C., MMA/DS=4/1, PMMA=10 wt % (based on the total weight of MMA, DS and PMMA), and AIBN=0.1 wt % (based on the weight of MMA).

The preparing conditions of two plastic rods were the same as those described in the title of the examples except that the centrifugal time $t_1$ was varied. The results are shown in Table 5. The data in Table 5 show that Δn increases with increasing centrifugal time $t_1$.

TABLE 5

Effects of centrifugal time on the optical characteristics of GRIN rods[a].

|  | Ex. 18 | Ex. 19 |
| --- | --- | --- |
| $t_1$ (hour) | 2 | 3 |
| Δn | 0.0206 | 0.0227 |
| A | 0.0404 | 0.0377 |
| NA | 0.2486 | 0.2681 |
| $2θ_{max}$ | 28.79 | 30.27 |

[a]$T_1 = 50°$ C., MMA/DS = 4/1, PMMA = 10 wt %, and AIBN = 0.1 wt %.

Examples 20–21

Reproducibility of optical characteristics of GRIN rods

Two of plastics rods were prepared in these examples, in which the preparing conditions were $T_1=55°$ C., $t_1=2$ h, AIBN=0.1 wt % (based on the weight of MMA), MMA/DS=4/1, and PMMA =20 wt % (based on the total weight of MMA, DS and PMMA); and $T_1=55°$ C., $t_1=2$ h, AIBN=0.1 wt % (based on the weight of MMA), MMA/DS=5/1, and PMMA=0.1 wt %. The preparing conditions were repeated to prepare another two plastics rods. The results are shown in Table 6.

TABLE 6

Reproducibility of optical characteristics of GRIN rods

|  | Ex. 20 | Ex. 21 |
| --- | --- | --- |
| MMA/DS | 4/1 | 5/1 |
| PMMA | 20 wt % | 0 wt % |
| Δn | 0.0212 (0.0212)[a] | 0.0213 (0.0213) |
| NA | 0.2522 (0.2523) | 0.2528 (0.2530) |
| $2θ_{max}$ | 29.22 (29.23) | 29.29 (29.30) |

[a]The values shown in the brackets are the optical characteristics of the plastic rods prepared under the same conditions.

It can seen from Table 6 that the process of the present invention has good reproducibility of optical characteristics of GRIN rods with or without the use of prepolymer (PMMA) in the monomer mixture.

Examples 22–23

GRIN plastic rods prepared with two monomers, $T_1=55°$ C., $t_1=2$ h, MMA/BzMA=3/1 and 4/1, PMMA=20 wt % (based on the total weight of MMA, BzMA and PMMA), and AIBN=0.1 wt % (based on the total weight of MMA and BzMA).

The preparing conditions of two plastic rods were the same as those described in the title of the examples except that the feed weight ratio in the monomer mixture was varied. The results are shown in Table 7.

TABLE 7

GRIN plastic rods prepared with two monomers[a].

|  | Ex. 22 | Ex. 23 |
| --- | --- | --- |
| MMA/BzMA | 3/1 | 4/1 |
| Δn | 0.015 | 0.014 |
| NA | 0.213 | 0.201 |
| $2θ_{max}$ | 24.6 | 23.5 |

[b]$T_1 = 55°$ C., $t_1 = 2$ h, PMMA = 20 wt %, and AIBN =0.1 wt %.

Examples 24–25

GRIN plastic rods prepared with two monomers, $T_1=65°$ C., $t_1=2$ h, MMA/BzMA=3/1 and 4/1, PMMA=2 wt % (based on the total weight of MMA, BzMA and PMMA), and AIBN=0.1 wt % (based on the total weight of MMA and BzMA).

The preparing conditions of two plastic rods were the same as those described in the title of the examples except that the feed weight ratio in the monomer mixture was varied. The results are shown in Table 8.

TABLE 8

GRIN plastic rods prepared with two monomers[a].

|  | Ex. 22 | Ex. 23 |
| --- | --- | --- |
| MMA/BzMA | 3/1 | 4/1 |
| Δn | 0.0304 | 0.0261 |
| NA | 0.3002 | 0.2821 |
| $2θ_{max}$ | 34.93 | 32.78 |

[a]$T_1 = 65°$ C., $t_1 = 2$ h, PMMA = 2 wt %, and AIBN = 0.1 wt %.

The symmetry of the GRIN rod fabricated in accordance with the process of the present invention was confirmed by the measurement of three-dimensional refractive index profile [S. P. Wu, E. Nihei, Y. Koike, Polym. J. 27, 21 (1995); C. Wang, D. L. Shealy, Appl. Opt. 32, 4763 (1993); Y. Ohtsuka, Y. Terao, J. Appl. Polym. Sci. 26, 2907 (1981)].

Figure 6:
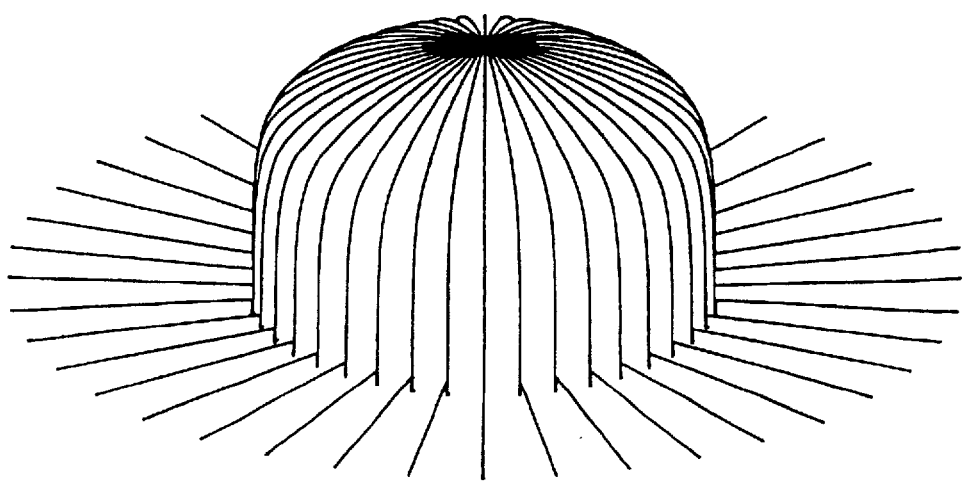
FIG. 6 is a 3-D plot which shows Δn distribution of GRIN rods prepared according to the present invention, wherein MMA/DS=3/1; $T_1=55°$ C., $t_1=2$ h, AIBN=0.1 wt %.

The analyzed results are shown in FIG. 6, which suggest that a good symmetric GRIN rod can be fabricated by using the present process with $T_1=55°$ C., $t_1=2$ h, MMA/DS=3/1, AIBN=0.1 wt %.

Figure 7A:
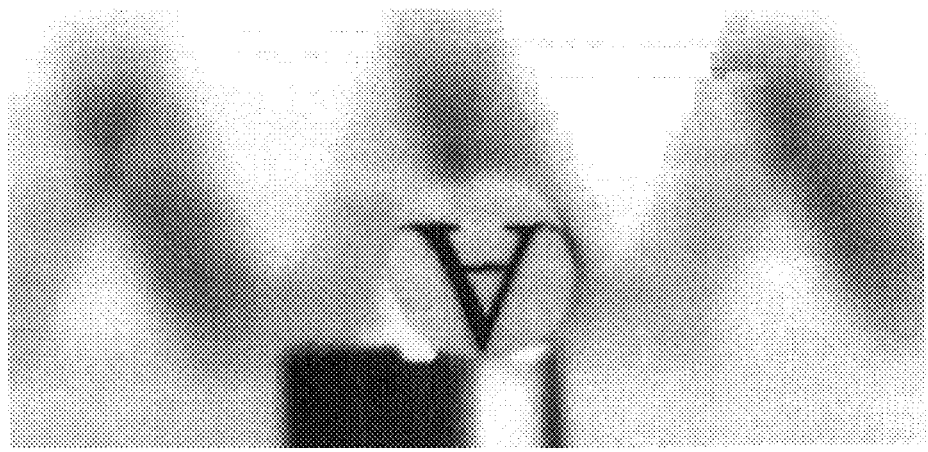
FIGS. 7(a) and 7(b) shows images observed through the GRIN rod prepared according to the present invention rod with 6 mm diameter and 45 mm length (MMA/DS=3/1, $T_1=55°$ C., $t_1=2$ h, AIBN=0.1 wt %). The size of the letters are all 5 mm×5 mm.
Figure 7B:
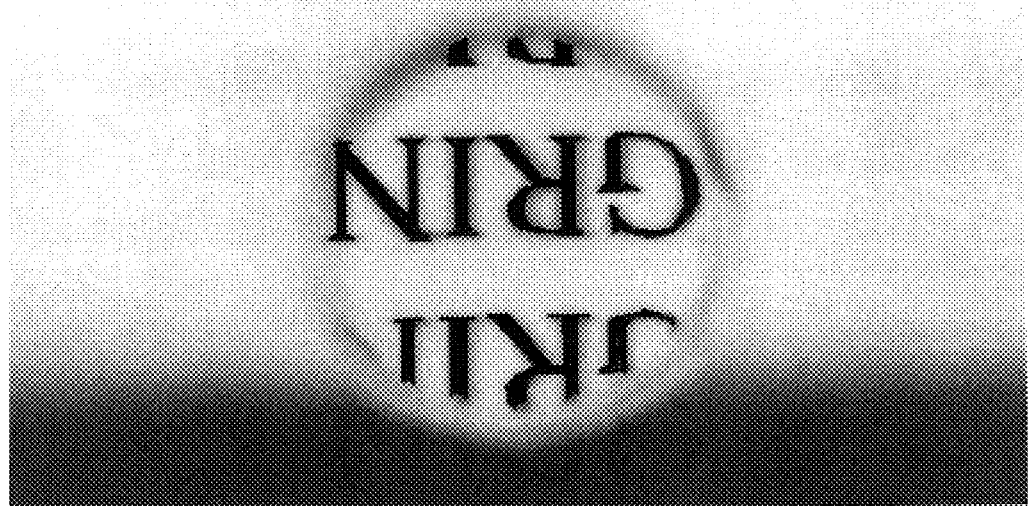

FIGS. 7(a) and 7(b) show the real images of the letters with 5 mm×5 mm observed through the GRIN rods with 6 mm diameter prepared by using the present process under $T_1=55°$ C., $t_1=2$ h, MMA/DS=3/1, AIBN=0.1 wt %. The distance between the letter "A" and the end face of the GRIN rod is 50 mm (FIG. 7(a)), and the distance between the letters "GRIN" and the end face of the GRIN rod is 72 mm (FIG. 7(b)). As shown in FIGS. 7(a) and 7(b), no image distortion is found. The results mean that GRIN plastic rod can be fabricated by using the novel centrifugal diffusion polymerization technique disclosed in the present invention.

What is claimed is:

1. A process for fabricating a gradient refractive-index plastic rod comprising the following steps:
   a) sealing a monomer composition in a tube, wherein said monomer composition comprises a first monomer and at least a component selected from the group consisting of a second monomer and a non-reactive dopant;
   b) prepolymerizing the first monomer, and the second monomer, if present, while rotating the tube horizontally around its longitudinal axis; and
   c) polymerizing the resulting prepolymer or prepolymers while keeping the tube vertical, so that i) a plastic rod comprising the resulting polymer of the first monomer and the non-reactive dopant; ii) a plastic rod comprising the resulting polymers of the first monomer and the second monomer; or iii) a plastic rod comprising the resulting polymers of the first monomer and the second monomer, and the non-reactive dopant is formed in the tube,
   wherein the non-reactive dopant has a refractive index greater than that of the resulting polymer of the first monomer in case i); the first monomer has a polymerization reactivity higher than that of the second monomer, and the resulting polymer of the first monomer has a refractive index less than that of the resulting polymer of the second monomer in case ii); and the non-reactive dopant has a refractive index greater those of the resulting polymers of the first monomer and the second monomer in case iii).

2. The process according to claim 1, wherein an additional prepolymer or oligomer of the first monomer is added to the monomer composition prior to sealing.

3. The process according to claim 1, wherein an initiator for polymerizing the first monomer is added to the monomer composition prior to sealing.

4. The process according to claim 2, wherein an initiator for polymerizing the first monomer is added to the monomer composition prior to sealing.

5. The process according to claim 1, wherein the first monomer is acrylate.

6. The process according to claim 5, wherein the first monomer is methyl methacrylate, benzyl methacrylate, or tetra-fluoropyl methacrylate.

7. The process according to claim 1, wherein the second monomer is acrylate.

8. The process according to claim 7, wherein the second monomer is methyl methacrylate, benzyl methacrylate, or tetra-fluoropyl methacrylate.

9. The process according to claim 1, wherein the non-reactive dopant is selected from the group consisting essentially of diphenyl sulfide, benzyl salicylate, 1,4-dibromobenzene, 1-bromonaphthalene and triphenyl phosphate.

10. The process according to claim 9, wherein the non-reactive dopant is diphenyl sulfide and the first monomer is methyl methacrylate, benzyl methacrylate, or tetra-fluoropyl methacrylate.

11. The process according to claim 8, wherein the first monomer is methyl methacrylate and the second monomer is benzyl methacrylate.

12. The process according to claim 1, wherein the tube is a glass tube.

13. The process according to claim 1, wherein the prepolymerization in step b) is carried out by heating the tube at a temperature of 35–100° C. for a period of 1–15 hours while rotating the tube at a speed of 80–1000 rpm.

14. The process according to claim 1, wherein the prepolymerization in step b) is carried out by irradiating the tube for a period of 1–15 hours while rotating the tube at a speed of 80–1000 rpm.

15. The process according to claim 1, wherein the polymerization in step c) is carried out by heating the tube at a temperature of 35–100° C. for a period of 1–15 hours.

16. The process according to claim 1, wherein the polymerization in step c) is carried out by irradiating the tube for a period of 1–15 hours.

17. The process according to claim 1, wherein the monomer composition in step a) comprises 15–30% of the non-reactive dopant and 85–70% of the first monomer, based on the weight of the monomer composition.

18. The process according to claim 2, wherein the monomer composition in step a) comprises 15–30 wt % of the non-reactive dopant, 83–50 wt % of the first monomer and 2–20 wt % of the additional prepolymer or oligomer, based on the weight of the monomer composition.

19. The process according to claim 17, wherein the monomer composition in step a) further comprises 0.1–0.5 wt % of an initiator for polymerizing the first monomer, based on the weight of the first monomer.

20. The process according to claim 18, wherein the monomer composition in step a) further comprises 0.1–0.5 wt % of an initiator for polymerizing the first monomer, based on the weight of the first monomer.

21. The process according to claim 20, wherein the first monomer is methyl methacrylate, benzyl methacrylate, or tetra-fluoropyl methacrylate.

22. The process according to claim 20, wherein the non-reactive dopant is selected from the group consisting essentially of diphenyl sulfide, benzyl salicylate, 1,4-dibromobenzene, 1-bromonaphthalene and triphenyl phosphate.

23. The process according to claim 20, wherein the non-reactive dopant is diphenyl sulfide and the first monomer is methyl methacrylate, benzyl methacrylate, or tetra-fluoropyl methacrylate.

24. The process according to claim 1, wherein the monomer composition in step a) comprises 15–30% of the second monomer and 85–70% of the first monomer, based on the weight of the monomer composition.

25. The process according to claim 2, wherein the monomer composition in step a) comprises 15–30 wt % of the second monomer, 83–50 wt % of the first monomer and 2–20 wt % of the additional prepolymer or oligomer.

26. The process according to claim 24, wherein the monomer composition in step a) further comprises 0.1–0.5 wt % of initiators for polymerizing the first monomer and the second monomer, based on the total weight of the first and second monomers.

27. The process according to claim 25, wherein the monomer composition in step a) further comprises 0.1–0.5 wt % of initiators for polymerizing the first monomer and the second monomer, based on the total weight of the first and second monomers.

28. The process according to claim 27, wherein the first monomer is methyl methacrylate, benzyl methacrylate, or tetra-fluoropyl methacrylate.

29. The process according to claim 28, wherein the second monomer is methyl methacrylate, benzyl methacrylate, or tetra-fluoropyl methacrylate.

30. The process according to claim 28, wherein the first monomer is methyl methacrylate and the second monomer is benzyl methacrylate.

31. The process according to claim 1, wherein the plastic rod has a gradient refractive index decreasing in a direction from its central axis to its periphery from within a region from its central axis to 80% of its radius.

* * * * *